United States Patent [19]

Siard et al.

[11] 4,155,696
[45] May 22, 1979

[54] APPARATUS FOR BLOW MOLDING

[75] Inventors: Michel Siard, Ste Adresse; Daniel Pellerin, Le Havre, both of France

[73] Assignee: Societe anonyme dite Compagnie Francaise de Raffinage, Paris, France

[21] Appl. No.: 885,026

[22] Filed: Mar. 8, 1978

Related U.S. Application Data

[63] Continuation of Ser. No. 661,242, Feb. 25, 1976, abandoned.

[30] Foreign Application Priority Data

Feb. 28, 1975 [FR] France .............................. 75 06464

[51] Int. Cl.² ............................................. B29C 17/07
[52] U.S. Cl. .................................. 425/522; 264/536; 264/540; 425/534; 425/537
[58] Field of Search ................ 264/98, 334; 425/534, 425/537, 522, 436 R, 436 RM

[56] References Cited

U.S. PATENT DOCUMENTS

| 3,817,678 | 6/1974 | Armour | 425/525 |
| 3,954,186 | 5/1976 | Hafele | 425/436 R X |

Primary Examiner—Jan H. Silbaugh
Attorney, Agent, or Firm—Haseltine, Lake & Waters

[57] ABSTRACT

A process and apparatus for blow-molding hollow bodies in a mold having half-molds which are closed along a mold joint during blow molding and are laterally displaced with respect to one another to open the mold for removal of the formed hollow body. The half-molds are shaped to form a concave bottom on the hollow body and when the half-molds are opened they impose a translation movement on the hollow body. A plug is formed at the bottom of the hollow body during molding which plug is seized by pincers prior to the opening of the mold such that the hollow body is supported by the pincers during mold opening. The pincers are displaced during mold opening, in translation parallel to the plane of the mold joint, over a distance at least equal to that imposed on the hollow body by the half-molds during opening of the mold.

3 Claims, 8 Drawing Figures

APPARATUS FOR BLOW MOLDING

This is a continuation of application Ser. No. 661,242 filed Feb. 25, 1976, now abandoned.

FIELD OF THE INVENTION

The present invention relates to processes and apparatus for blow molding thermoplastic preforms and more particularly to the extraction from the mold of blow-molded products.

BACKGROUND OF THE INVENTION

It is known to industrially manufacture hollow bodies of a thermoplastic material by extruding a tubular preform of this material through an annular die, enclosing this preform in the interior of a mold and blowing air under pressure into the interior of this preform to inflate it and cause the plastic material to contact the walls of the mold, which are cooled so that at the contact of which the plastic material solidifies.

The mold that is utilized generally comprises two half-molds between which the preform is extruded. The "plug" which passes from the mold at its lower portion and which is constituted by the excess of plastic material, serves generally for the removal from the mold of the hollow body, thus obtained, by means of automatic pincers. These advance the hollow body to finishing stations where, among other operations, the plug is removed.

This mode of manufacture has a number of disadvantages particularly when, for reasons imposed by their ultimate utilization (filling, automatic handling etc.), the hollow body products must have a base with a very pronounced concavity.

These disadvantages which will be described in greater detail later, with reference to the annexed drawings, can be summarized as follows:

If the pincers seize the plug while the mold is still closed, the displacement of the mold-halves perpendicularly to the plane of the mold joint at the time of opening of the mold has the effect of enforcing an ascending movement of the hollow body by an amount equal to the concavity of the bottom. Since the body is held by the pincers through the intermediary of the plug, there results either a deformation of the bottom or a premature tearing and separation of the plug.

If to avoid this disadvantage, the pincers only seize the plug at the end of the course of opening of the half-molds, the hollow body is no longer supported in the plane corresponding to the plane of the mold joint and there is the risk that the body will be caught and displaced by one or the other of the half-molds. In addition, the pincers must seize the plug which is not properly guided and already cooled, this substantially affecting the regularity of the subsequent steps of the process.

SUMMARY OF THE INVENTION

An object of the invention is to remedy these disadvantages by providing an apparatus for blow molding in which the pincers which support the plug at the bottom of the hollow body accompanies the same in its successive displacements at the opening of the mold parallel to the plane of the mold joint by imposing a movement on the pincers capable of disengaging it without any stressess from the half-molds.

A further object of the invention is to provide a process for blow molding a hollow body of the type in which a plug adjoining the bottom of the hollow body is seized by the pincers prior to the opening of the mold and is supported by the pincers during the opening phase, the improvement consisting in that during the opening phase of the mold, there is imposed on said pincers a movement in translation parallel to the plane of the mold joint with an amplitude at least equal to that of the movement that the half-molds simultaneously impose on the hollow body.

Advantageously, the movement of said pincers will be in correspondence with the opening movement of the mold.

Another object of the invention is constituted by an apparatus for blow molding of the type including two half-molds which are laterally displaced during the opening phase of the mold and a pincers adapted to support the adjoining plug at the bottom of the formed hollow body, during the opening of the mold, said apparatus being characterized in that it comprises in combination:

a control ramp fixed to one of the half-molds;
a feeler associated with said pincers and disposed in a manner to bear on said ramp when said pincers supports said plug;
control means coupled to said feeler to displace the said pincers during the opening phase of the mold by a translation movement parallel to the plane of the mold joint by an amount equal to that of the movement imposed simultaneously on the hollow body by said half-molds.

The control means can be mechanical, hydraulic or electrical and there can be introduced as desired a demultiplication or correction between the movement of the feeler and that of the pincers. It is advantageously adjustable in the course of utilization of the apparatus. The feeler can be solid with the pincers.

In one embodiment for carrying out the invention, a mechanical means is employed which comprises a rigid member fixed to the pincers and carrying a roller constituting the feeler. The ramp is inclined in the direction of the plane of the mold joint, the difference in level between the extremities of the ramp being at least equal to the concavity at the bottom of the hollow body, and means are provided for moving the pincers in the direction of the mold, parallel to the plane of the mold joint, during the opening of the mold.

BRIEF DESCRIPTION OF THE DRAWINGS

The schematic drawings attached hereto will make clear the novel characteristics of the invention and the technical progress produced thereby with respect to the known apparatus. The drawings only show in detail the portions of the half-molds which directly concern the invention, the other members being known to those skilled in the art and having been omitted or simply schematically illustrated.

DETAILED DESCRIPTION

Figure 1:
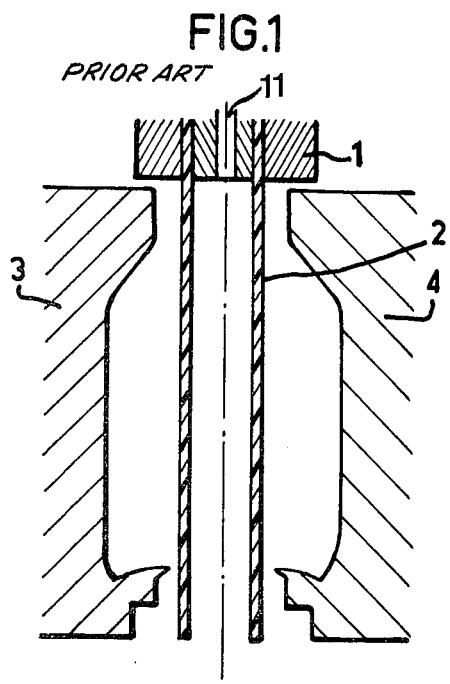
FIGS. 1, 2 and 3 are three sections perpendicular to the plane of the mold joint illustrating, respectively, the conventional phases of extrusion, blowing and extraction of a hollow body.
Figure 2:
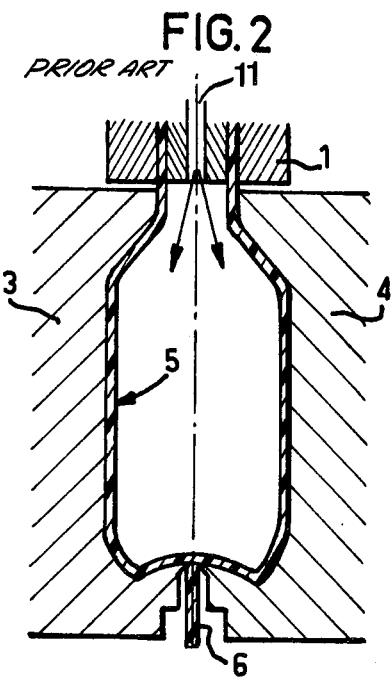
Figure 3:
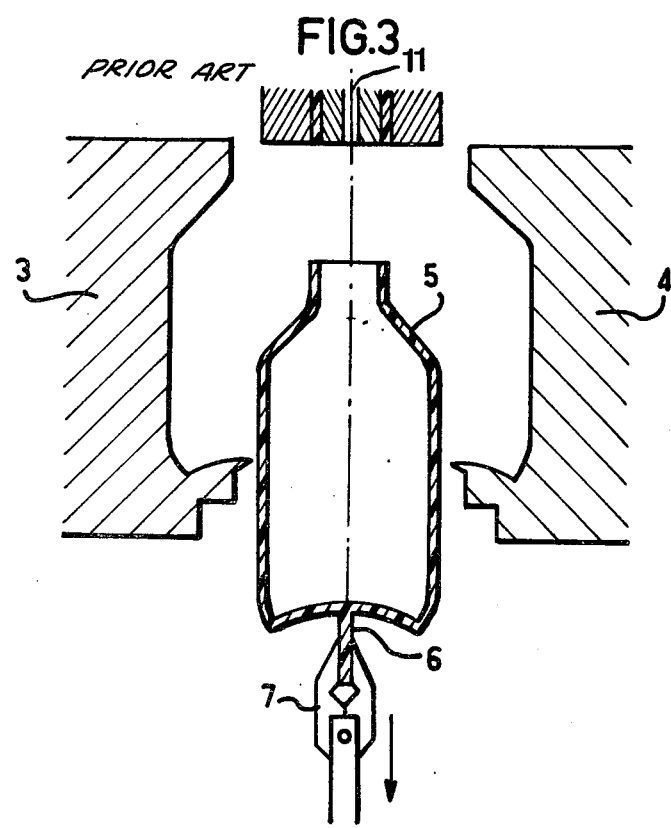

As is seen in FIGS. 1-3, the conventional process for blow molding of hollow bodies comprises firstly the extrusion through an annular die 1 of a preform 2 of a thermoplastic material. This preform is then enclosed (FIG. 1) in a mold constituted by two half-molds capable of being laterally displaced with respect to the plane of the mold joint.

If air under pressure is then inflated into the preform, for example, via an axial conduit 11 in the head of the die 1, the material constituting this preform comes into contact with the internal walls of the half-molds 3 and 4. The walls are cooled by means, not shown, such that the thermoplastic material is solidified on contact to produce a vessel 5 (FIG. 2), the excess of plastic material forming a plug 6 which passes to the exterior of the mold and which will be ultimately removed.

As shown in FIG. 3, the plug 6 can be seized by pincers 7 which permit extracting the vessel 5 from the mold after opening thereof and for transport of this vessel to following work stations.

Figure 4:
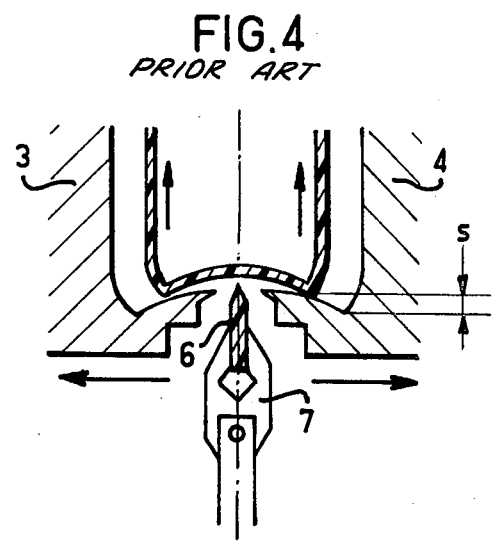
FIGS. 4 and 5 are partial sections analogous to those above, illustrating two types of incidents encountered with the known apparatus in the course of the opening phase of the mold.
Figure 5:
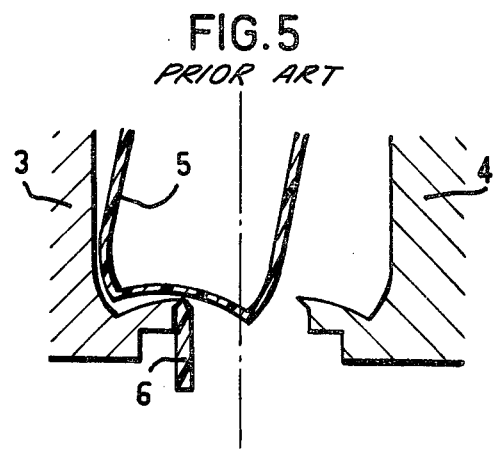

As it has already been indicated, this conventional process of manufacture presents serious disadvantages, notably when the bottom of the vessel that is desired to be obtained has a pronounced concavity. In fact, when the half-molds 3 and 4 are laterally displaced from one another at the time of opening of the mold, their displacement perpendicular to the plane of the joint of the mold produces a displacement of the vessel 5 parallel to this plane of the joint by an amount equal to the concavity of the bottom. If the pincers 7 have seized the plug during this phase, there is the risk of either deforming the bottom of the body or provoking a separation of the plug from the vessel (FIG. 4). If one waits for the half-molds to arrive at the end of travel to seize the plug by the pincers 7, the vessel 5 is no longer supported during the opening of the mold so that it can be carried by one or the other of the half-molds risking rocking in the direction of the plane of the joint (FIG. 5).

Figure 6:
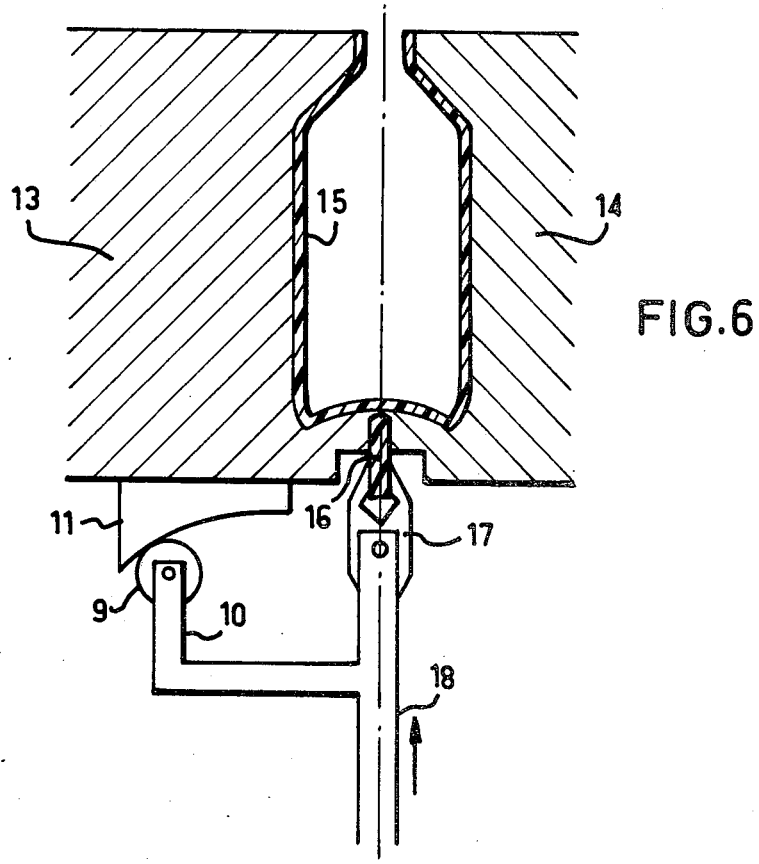
FIG. 6 is a sectional view perpendicular to the plane of the joint of the mold of an embodiment of apparatus according to the invention.

In order to remedy these serious disadvantages, the apparatus according to the invention, shown in FIG. 6, comprises pincers 17 which seize the plug 16 at the bottom of the vessel before the opening of the mold but which accompany the vessel in its ascending movement along the plane of the joint during the opening phase. In this figure, there is again seen the two half-molds 13 and 14 between which has been formed a vessel of thermoplastic material whose excess forms the plug 16 which extends from the mold. According to the invention, the pincers 17 which seize the plug before opening of the mold are mounted on a column 18 capable of being displaced parallel to the plane of the mold joint and to which is rigidly fixed an arm 10, the extremity of which forms a carrier for a roller 9 which is rotatable around an axis.

A guide ramp 11 directed perpendicularly to the plane of the joint of the mold has a difference in level between its extremities greater than the concavity of the vessel to be formed, said ramp 11 being fixed to the bottom of the half-mold 13. The roller 9 is adapted to be in contact with the ramp 11 during the opening phase of the mold so as to be urged by this ramp in the same manner as the bottom of the vessel 15 by the corresponding face of the half-mold 13.

Figure 7:
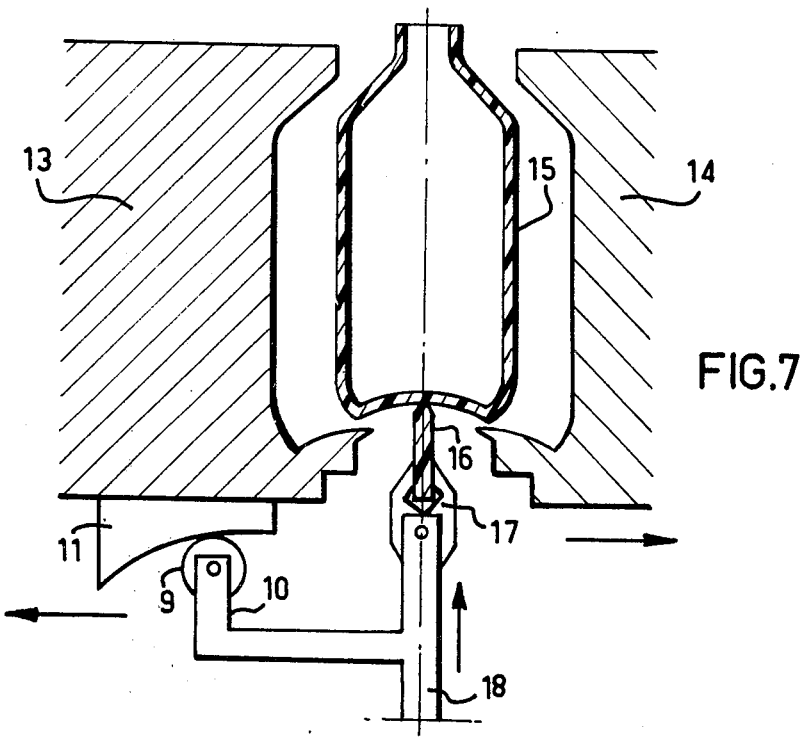
FIGS. 7 and 8 are analogous sections showing the operation of the apparatus according to the invention, respectively, during the phases of opening of the mold and extraction of the hollow body.

This is going to be described in detail with reference to FIGS. 6 and 7.

During the blowing phase of the preform, the column 18 is displaced in the direction of the mold. At the end of the travel, the roller 9 bears against the extremity of the ramp 11 at the maximum distance from the plane of the joint while simultaneously the pincers grip the plug 16.

When the mold is opened after cooling of the vessel 15 (FIG. 7) the column 18 continues to be urged in the direction of the bottom of the mold such that the roller 9 is applied against the ramp 11 and rolls thereon when the half-molds 13 and 14 are laterally displaced from one another. The pincers 17 are displaced in the direction of the mold parallel to the plane of the mold joint and they displace the plug 16 and the vessel 15, the latter being thus disengaged from the half-molds without application of any stresses on its base, the axis of the vessel remaining parallel to the plane of the joint of the mold.

Figure 8:
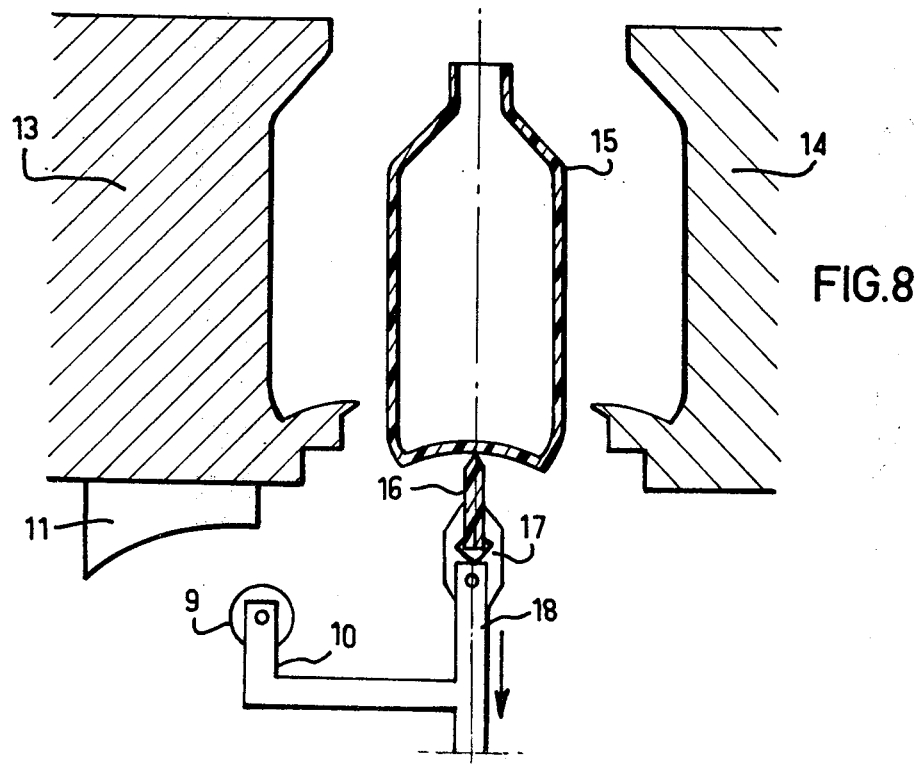

At the end of opening of the mold (FIG. 8) the column is displaced in the opposite direction and the pincers 17 remove the vessel 15 from the mold. The displacement of the column 18 is effected in any conventional manner, as for example, by a hydraulic cylinder.

It can be seen that the extraction of the vessel is effected, consequently, without any secondary stresses applied to the vessel which otherwise would cause a reduction in the cycle of fabrication. The absence of accidental stoppage due to contact of the vessels in the mold leads to a more regular operation of the apparatus according to the invention.

What is claimed is:

1. An improved apparatus for blow molding hollow plastic articles employing: a mold formed of two halves closable along a mold joint generally defining a plane, said mold being provided with a convex bottom molding surface and plug forming means adjacent thereto; means for blow molding a hollow plastic article in said mold, said blow molded article having a concave bottom with a plug extending generally along a plane of said mold joint from the bottom of the mold; means for closing and opening the mold by displacing said two half-molds laterally of said plane; pincer means disposed below said mold and having an operable position adapted to seize the plug of the blown molded article prior to opening the mold and removal of the blown molded article; the improvement comprising: means for displacing the pincer means while in said operable position during the opening of the mold, by translatory movement parallel to the plane of the mold joint, in a direction toward said mold and by an amount at least equal to that of the movement simultaneously imposed on the bottom of the hollow article by the bottom of the mold.

2. An improved apparatus as claimed in claim 1, employing means for displacing said pincer means during opening of the mold, said improvement comprising: a control ramp fixed to one of the mold halves; feeler means associated with said pincer means, said feeler means bearing against said control ramp as said pincers seize said plug; and control means coupling said feeler means to said pincer means.

3. An improved apparatus as claimed in claim 2, employing control means, said improvement comprising: a roller carrying member being rigidly secured to said pincer means for carrying a roller forming said feeler means; said ramp having a face inclined in the direction of the plane of the mold joint and having a difference in leverage between two extremities thereof, said difference being at least equal to the concavity existing at the bottom of a hollow article.

* * * * *